US012759467B2

(12) United States Patent
Harris

(10) Patent No.: US 12,759,467 B2
(45) Date of Patent: Oct. 13, 2026

(54) REAR SEAT VIEWING DEVICE FOR A VEHICLE AND METHOD THEREFOR

(71) Applicant: August Bernard Harris, San Francisco, CA (US)

(72) Inventor: August Bernard Harris, San Francisco, CA (US)

( * ) Notice: Subject to any disclaimer, the term of this patent is extended or adjusted under 35 U.S.C. 154(b) by 0 days.

(21) Appl. No.: 18/822,730

(22) Filed: Sep. 3, 2024

(65) Prior Publication Data

US 2026/0061935 A1 Mar. 5, 2026

(51) Int. Cl.

*B60R 1/29* (2022.01)
*B60N 2/00* (2006.01)
*B60R 1/06* (2006.01)
*H04N 7/18* (2006.01)

(52) U.S. Cl.

CPC .............. *B60R 1/29* (2022.01); *B60N 2/0035* (2023.08); *B60R 1/06* (2013.01); *H04N 7/188* (2013.01)

(58) Field of Classification Search

CPC ........... B60R 1/29; B60R 1/06; B60N 2/0035; H04N 7/188

See application file for complete search history.

(56) References Cited

U.S. PATENT DOCUMENTS 9,217,535 B1 * 12/2015 Egan ...................... F16M 13/02
10,446,018 B1 * 10/2019 Han ...................... B60K 35/22
11,012,667 B1 * 5/2021 Nodder .................. H04N 7/181
11,472,332 B1 * 10/2022 Salter .................... B60Q 1/247
11,639,134 B1 * 5/2023 Huizen ..................... B60R 1/04 348/77
2002/0149544 A1 * 10/2002 Rosen .................... B60K 35/10 348/E7.086
2005/0274168 A1 * 12/2005 Stuetzler ............. B60R 21/0136 310/338
2005/0275512 A1 * 12/2005 Shimoyama ........... B60Q 9/005 348/148
2007/0193811 A1 * 8/2007 Breed ............... B60R 21/01552 180/271
2008/0203788 A1 * 8/2008 Hattori .................. B60N 2/818 297/217.3
2009/0135363 A1 * 5/2009 Yeh ..................... G09G 3/2092 349/149
2016/0193971 A1 * 7/2016 Yellambalase ........... B60Q 1/34 348/148
2016/0368417 A1 * 12/2016 Bassi ..................... B60K 35/10
2019/0126815 A1 * 5/2019 Morel .................... B60Q 1/324
2019/0202349 A1 * 7/2019 Winton .................. B60J 7/0007
2019/0344738 A1 * 11/2019 Ga ...................... B60N 2/0025
2019/0349571 A1 * 11/2019 Herman .................... B60R 1/27
2020/0262388 A1 * 8/2020 Maddelein .............. B60R 25/01
2021/0120204 A1 * 4/2021 Senapati ............. H04N 23/695
2022/0222465 A1 * 7/2022 Thooris .................... B60K 1/04
2022/0388457 A1 * 12/2022 Lathwesen ............. B60K 35/22
2023/0041503 A1 * 2/2023 Salter ...................... E05F 15/75
2023/0119302 A1 * 4/2023 Chuang ..................... B60R 1/08 296/1.11
2023/0343104 A1 * 10/2023 Ogorodnikov ......... G06V 20/58

* cited by examiner

*Primary Examiner* — Peter D Le

(74) *Attorney, Agent, or Firm* — Weiss & Moy, PC; Jeffrey D. Moy

(57) ABSTRACT

A rear seat viewing device for a vehicle has at least one monitoring device coupled to an exterior of the vehicle for monitoring activities behind the vehicle.

12 Claims, 5 Drawing Sheets

REAR SEAT VIEWING DEVICE FOR A VEHICLE AND METHOD THEREFOR

TECHNICAL FIELD

The present application relates generally to a viewing system, and more specifically, to a system for enhancing the visual ability of individuals sitting in the rear seats of the vehicle by extending viewing points of these individuals in the vehicle.

BACKGROUND

The ability to see one's surroundings may be important for safety reasons. While one may see what is directly in front of the individual, most individuals may be unaware of what may be happening behind them. Further, many areas may have obstructed views. For example, many Rear-seated passengers'visibility can be obstructed by the vehicle's C-pillar, creating blind spots and making it difficult to see approaching vehicles from rear-side corners. Individuals may be unaware of what may be around a blind corner as blind corners generally are obstructed until the individual is making the turn.

Because of the above inability to see one's surroundings, different devices have been developed to help individuals see their surroundings. Devices to aid individuals see in areas that may be obscured or not even visible may be well known. For example, an individual who rides a bike may have mirrors that attach to the handlebars of the bike or the rider's bike helmet to help see what may be located behind the rider. Recently, riding glasses have been developed which have built-in mirrors which may allow the rider to see what may be located behind them.

For drivers, most automobiles may be equipped with rear view mirrors and wing mirrors to provide the driver with a reflected view of what may be located behind the vehicle. Some wing mirrors may even be equipped with visual indicators to show when a vehicle or other object may be located in a blind spot of the vehicle.

While rear view mirrors and wing mirrors may help the driver see what may be behind the vehicle, they are of little assistance for passengers in the rear of the vehicle to see what may be located behind the vehicle. Passengers in the rear seat of the vehicle may need to see what is located behind the vehicle in order to prevent opening the door into oncoming traffic. Presently there are no permanently affixed devices which allow the passenger sitting in the rear seat of a vehicle to see objects or traffic located behind the vehicle.

Therefore, it would be desirable to provide a device that overcomes the problems discussed above. The device would allow passengers sitting in the rear of the vehicle to see objects or traffic located behind the vehicle in which they are sitting.

SUMMARY

According to an embodiment of the disclosure, a rear seat viewing device for a vehicle is provided. The rear seat viewing device for a vehicle has at least one monitoring device coupled to an exterior of the vehicle for monitoring activities behind the vehicle.

According to an embodiment of the disclosure, a rear seat viewing device is provided. The rear seat viewing device for a vehicle has at least one monitoring device coupled to an exterior of the vehicle for monitoring activities behind the vehicle, wherein the at least one monitoring device is a wing mirror coupled to a B pillar of the vehicle. The wing mirror has a frame. A mounting section is formed on a side edge of the frame to secure the wing mirror to the B pillar of the vehicle. A housing is coupled to the frame, wherein the housing adjustably secures a mirror within the frame.

According to an embodiment of the disclosure, a rear seat viewing device is provided. The rear seat viewing device for a vehicle has at least one monitoring device coupled to an exterior of the vehicle for monitoring activities behind the vehicle, wherein the at least one monitoring device is a video camera showing activities located behind the vehicle. A video display coupled to the video camera and showing the activities behind the vehicle. A plurality of sensors is coupled to the video display and the video camera, wherein inputs from a combination of sensors activates the video display and the video camera, wherein the plurality of sensors comprises a transmission sensor and a rear seat weight sensor.

Figure 1:
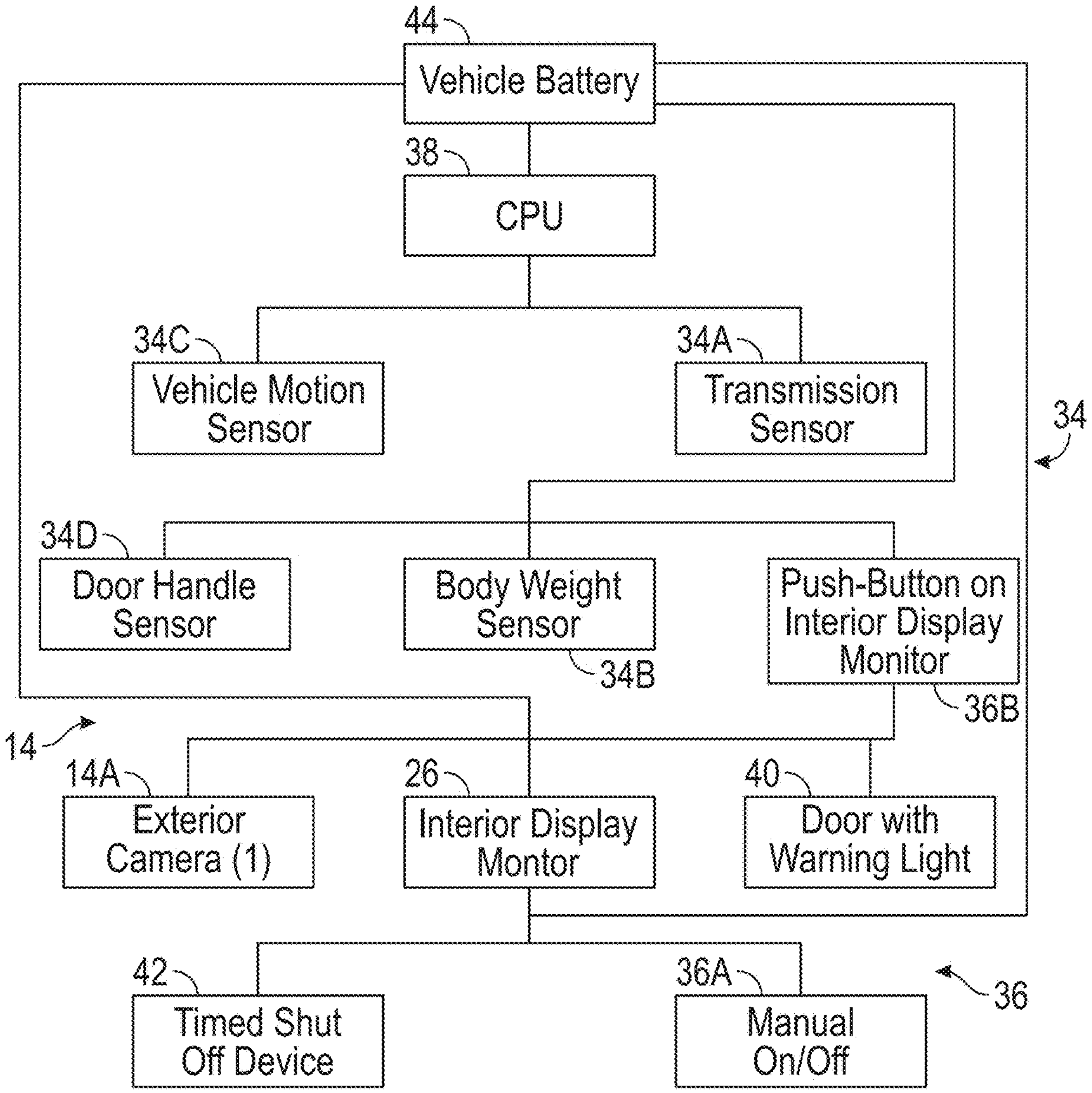
FIG. 1 is a block diagram of an exemplary rear seat viewing device, in accordance with one aspect of the present disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Figure 2:
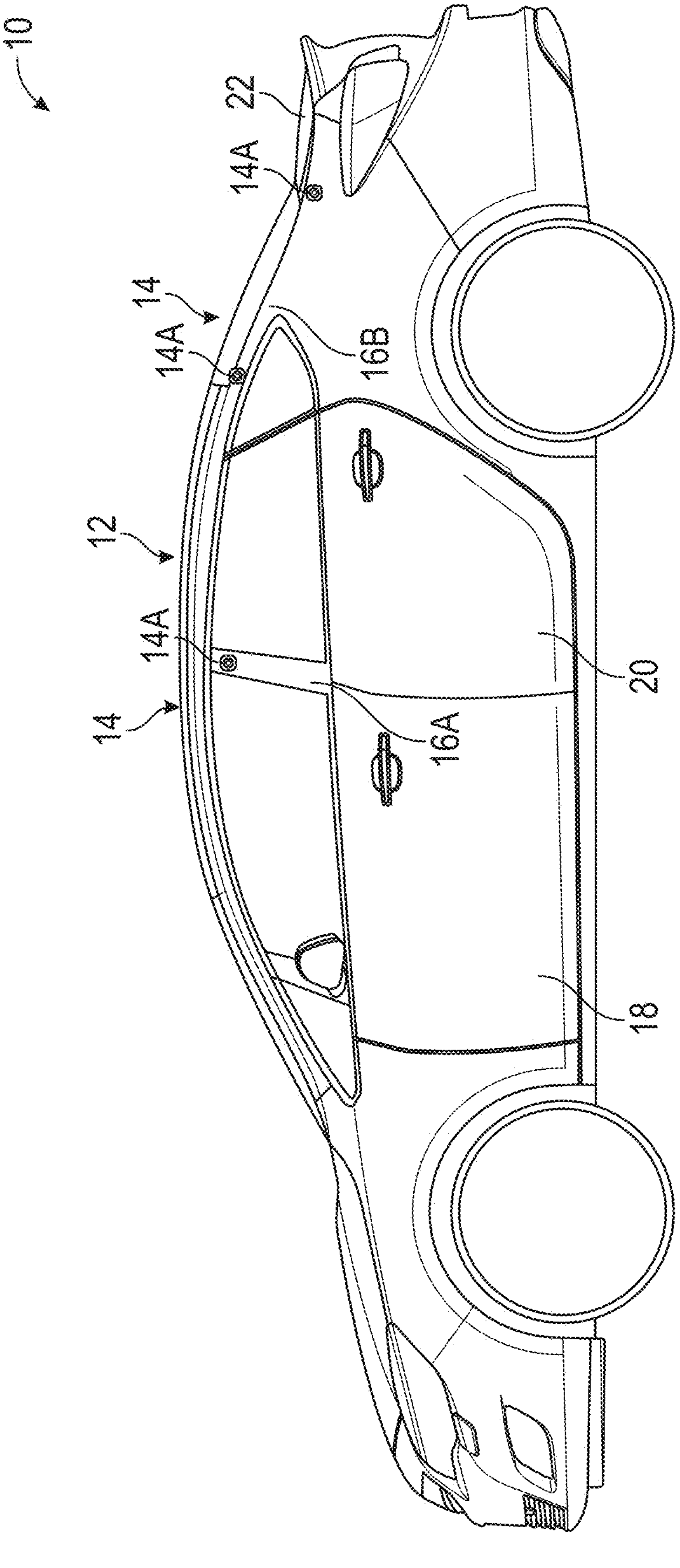
FIG. 2 is a side view of one embodiment of the exemplary rear seat viewing device of FIG. 1, in accordance with one aspect of the present disclosure.
Figure 3:
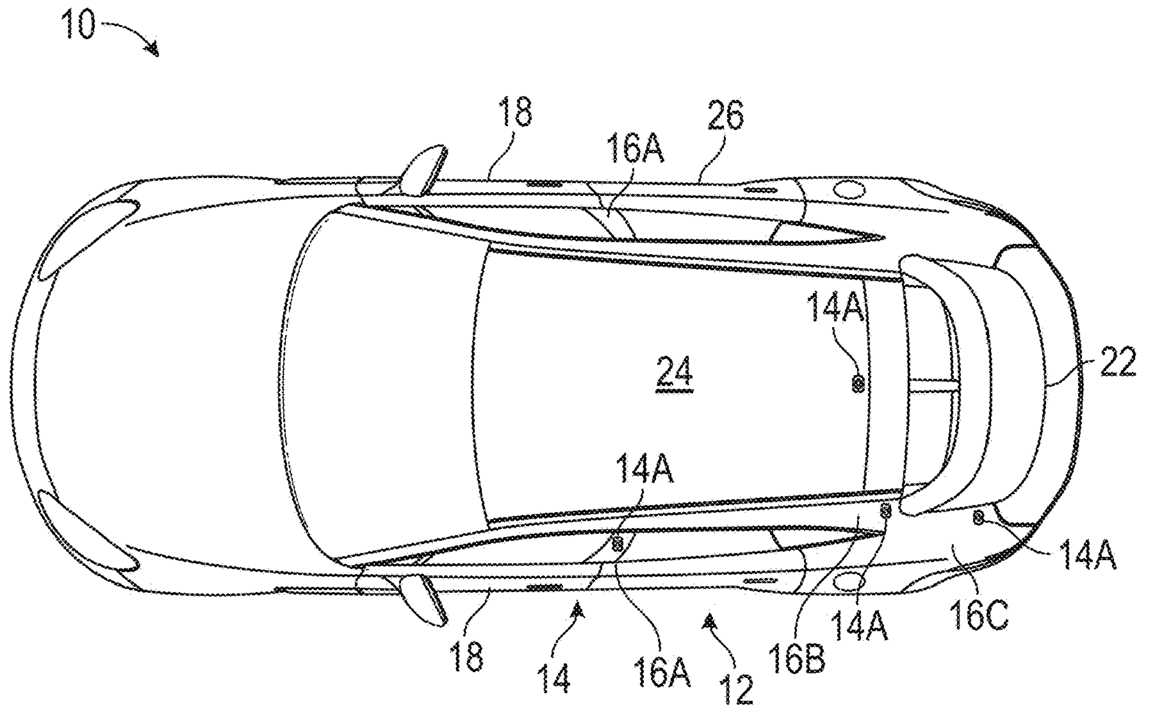
FIG. 3 is a top view of one embodiment of the exemplary rear seat viewing device of FIG. 1, in accordance with one aspect of the present disclosure.
Figure 4:
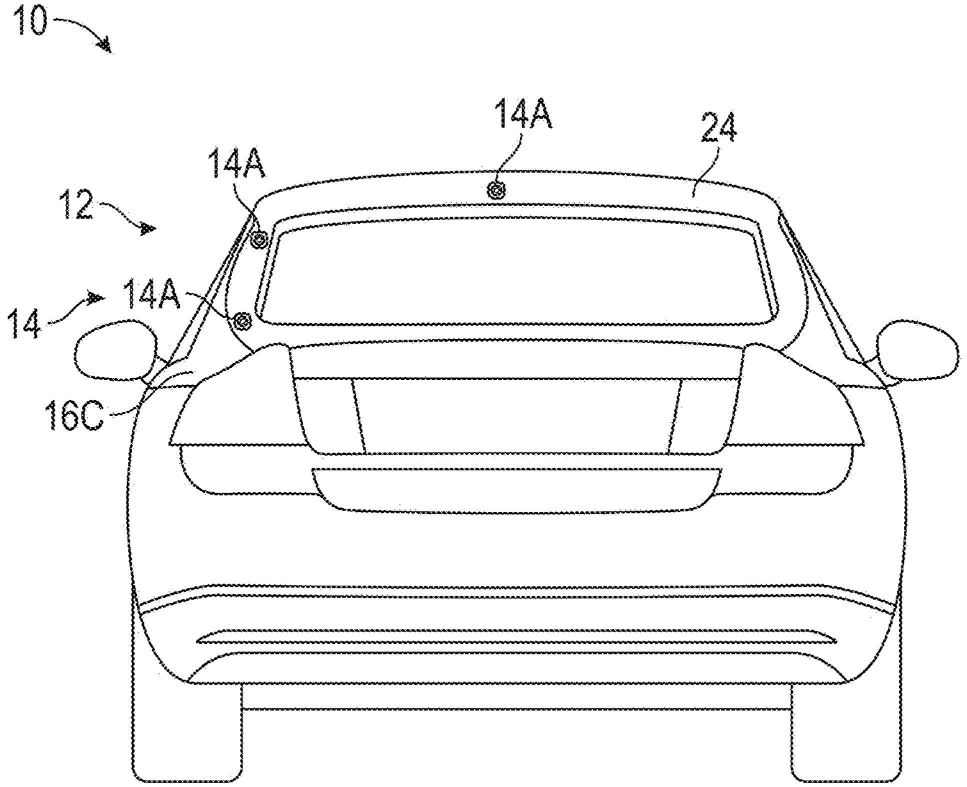
FIG. 4 is a rear view of one embodiment of the exemplary rear seat viewing device of FIG. 1, in accordance with one aspect of the present disclosure.
Figure 5:
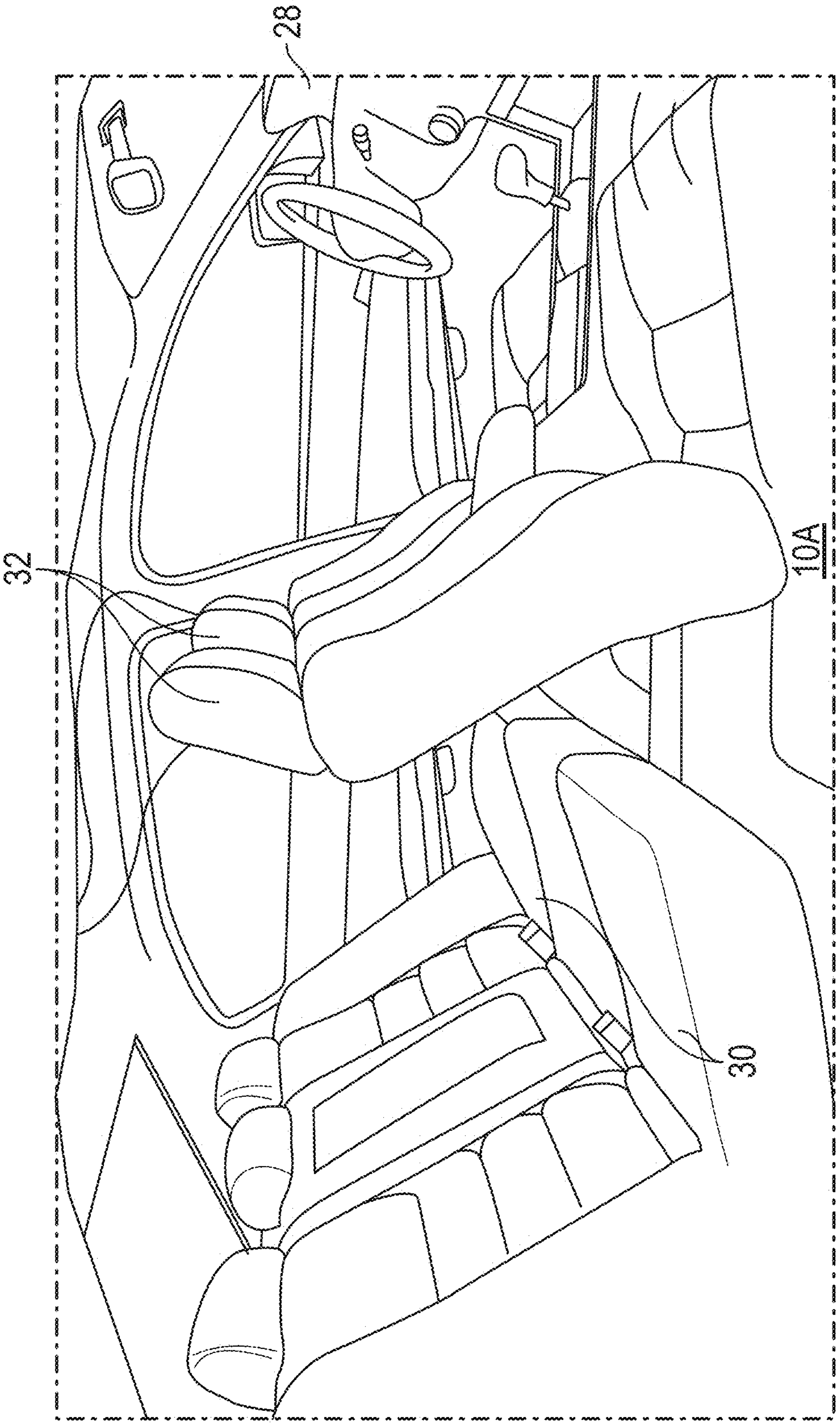
FIG. 5 is a side view of an interior of a vehicle having the exemplary rear seat viewing device of FIG. 1, in accordance with one aspect of the present disclosure.
Figure 6:
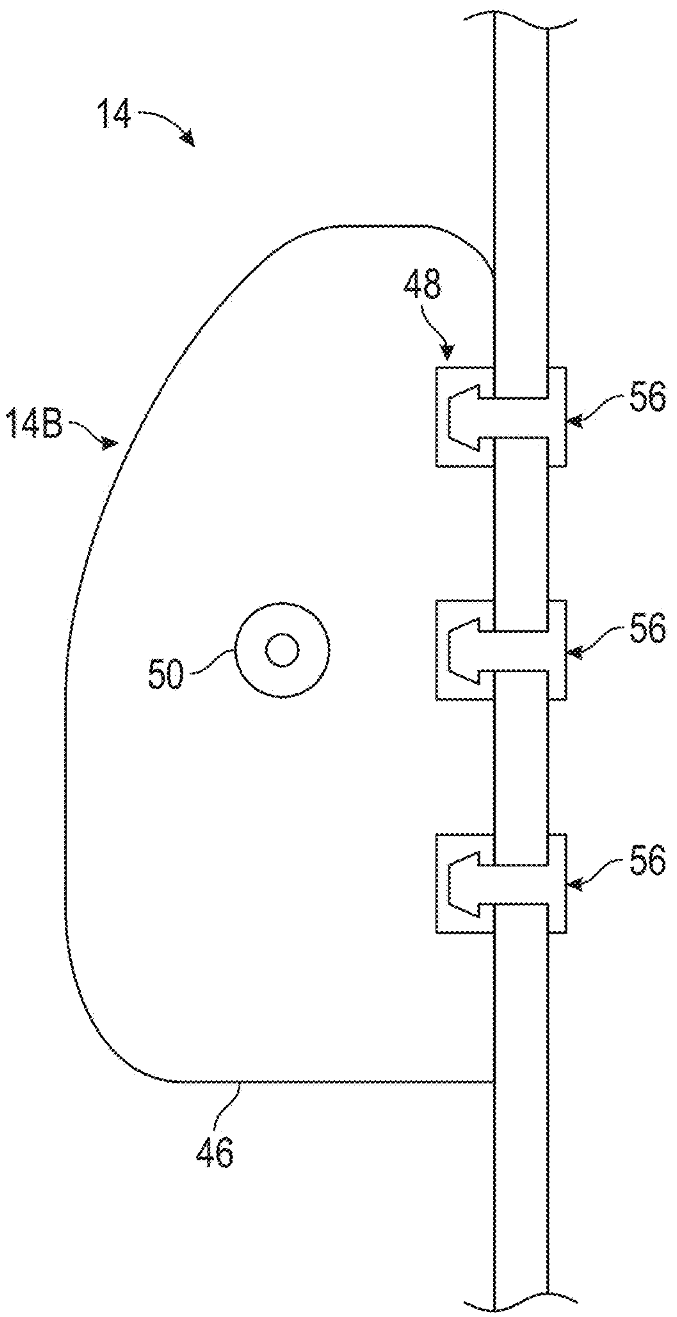
FIG. 6 is a front view of an exemplary rear seat viewing device, in accordance with one aspect of the present disclosure.
Figure 7:
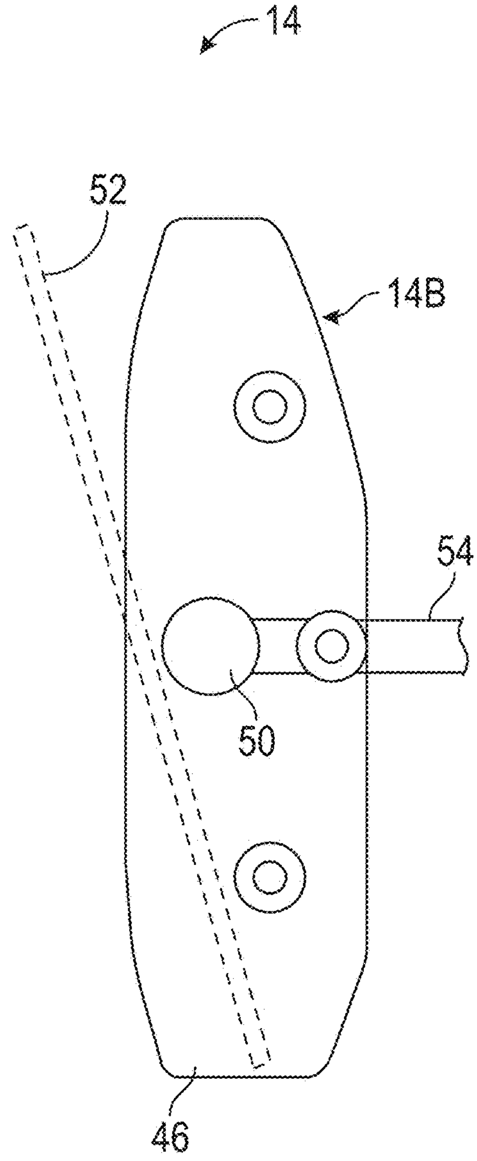
FIG. 7 is a side view of the exemplary rear seat viewing device of FIG. 5, in accordance with one aspect of the present disclosure.

Referring to FIGS. 2-4, vehicle 10 may be seen. The vehicle 10 may employ a r. seat viewing device 12 (hereinafter device 12). In the present embodiment, device 12 may have a monitoring unit 14. The monitoring unit 14 may be used to see what items/activities are located behind vehicle 10 such as traffic, pedestrians, bicyclist, motorcyclist, and the like. The listing may just be given as examples and should not be seen in a limiting manner. The monitoring unit 14 may be designed to see many different types of items and/or activities located behind the vehicle other than those listed without departing from the spirit and scope of the present invention.

The monitoring unit 14 may be located on different areas of vehicle 10. For example, the monitoring unit 14 may be located on one or both of the B pillars 16A of the vehicle 10 located between the front door 18 and rear door 20 of the vehicle 10. Alternatively, or in addition to, the monitoring unit 14, may be located on one or both of the C pillars 16B located behind the rear door 20 of vehicle 10. Alternatively, or in addition to, the monitoring unit 14, may be located on one or both of the rear quarter panels 16C located between the rear door 20 and the trunk 22 of the vehicle 10. Alternatively, or in addition to, the monitoring unit 14, may be located on a rear area of the roof 24 of the vehicle 10 or trunk of the vehicle 10.

In accordance with one embodiment, the monitoring unit 14 may be a video camera 14A. Referring now to FIGS. 1-5, video camera 14A may be located in the areas of the vehicle 10 shown in FIGS. 2-4 as well as other areas on vehicle 10 not described above. In this embodiment, device 12 may have display monitor 26 coupled to the one or more video cameras 14A. Display monitor 26 may be used to show what is being captured by the video cameras 14A. The display monitor 26 may be located within an interior 10A of the vehicle 10. The display monitor 26 may be located on the dashboard 28 and form part of the vehicle navigation or infotainment system. However, with the display monitor 26 located on the dashboard, it still may be difficult for passengers in the rear seats 30 to see the display monitor 26. Thus, in accordance with one embodiment, the display monitor 26 may be installed in one or more of the front seat headrests 32.

The display monitor 26 and the video cameras 14A may be coupled to one or more sensors 34 and controls 36. The sensors 34 and controls 36 may be used to determine whether device 12 should be activated or deactivated. For example, device 12 may have a control switch 36A to manually activate/deactivate the device 12 and/or to manually activate/deactivate the display monitor 26 and the video cameras 14A. The device 12 may also have a control switch 36B to manually activate/deactivate the display monitor 26.

The device 12 may have sensors 34 that may monitor whether vehicle 10 has been started and/or moving, if there is a passenger sitting in one or more of the rear seats 30 or the like. Sensors 34 may include a transmission sensor 34A. The transmission sensor 34A may monitor whether vehicle 10 is in gear or parked. The sensors 34 may include a motion sensor 34C. The motion sensor 34C may monitor whether vehicle 10 is moving or stopped. Alternatively, or in addition to, the motion sensor 34C may be a moving object sensor which may monitor and detect objects that may be moving and located proximate and/or behind vehicle 10. The sensors 34 may also include a body weight sensor 34B. The body weight sensor 34B may monitor to see if there is a passenger sitting in the rear seat 30. The sensors 34 may also include a rear door handle sensor 34D. The rear door handle sensor 34D may monitor if a passenger uses the interior handle of the vehicle 10 to open the rear door 20. It should be noted that the device 12 may use existing sensors 34 located within the vehicle 10.

The sensors 34 may be coupled to a processing unit 38. The processing unit 38 may monitor to see which of the sensors 34 have sent a signal of a monitored event. Based on the signals sent by the sensors 34 and received by the processing unit 38, the processing unit 38 may send signals to activate/deactivate the display monitor 26 and the video cameras 14A.

The processing unit 38 may send signals to activate/deactivate the display monitor 26 and the video cameras 14A based on one and/or a combination of signals received from the sensors 34. For example, the processing unit 38 may send signals to activate/deactivate the display monitor 26 and the video cameras 14A when the transmission sensor 34A senses and sends a signal that vehicle 10 is parked. Similarly, processing unit 38 may send signals to activate/deactivate the display monitor 26 and the video cameras 14A when the vehicle motion sensor 34C determines and sends a signal that the vehicle 10 has stopped (i.e., no motion). The above are given as examples and should not be seen in a limiting manner. The processing unit 38 may send signals to activate/deactivate the display monitor 26 and the video cameras 14A based on a combination of signals received from the sensors 34. For example, the processing unit 38 may send signals to activate/deactivate the display monitor 26 and the video cameras 14A based when the body weight sensor 34B determines that there is an individual sitting in the rear seat 30 and the transmission sensor 34A determines that the vehicle 10 is transmission is in park or when the body weight sensor 34B determines that there is an individual sitting in the rear seat 30 and the vehicle motion sensor 34C sends a signal that the vehicle 10 has stopped. With the display monitor 26 and the video cameras 14A activated, any passenger in the rear seat 30 may be able to see if there are any potential dangers in opening the rear door 20 of the vehicle 10. The above are given as examples and should not be seen in a limiting manner. The processing unit 38 may send signals to activate/deactivate the display monitor 26 and the video cameras 14A based on signals from any one or combination of the sensors 34.

The device 12 may also have a warning indicator 40 couple to the processing unit 38. The warning indicator 40 may be used to alert the passenger in the rear seat 30 to check the display monitor 26 prior to exiting. The warning indicator 40 may be located within interior 10A of the vehicle 10 proximate the area where the rear seats 30 are located. For example, the warning indictor 40 may be coupled to the rear door 20 or on a window of the rear door 20. In accordance with one embodiment, the warning indicator 40 may activate and/or illuminate in a similar manner as the display monitor 26 and the video cameras 14A. In this embodiment, the warning indicator 40 may activate and/or illuminate when the processing unit 38 receives event signals from one or a combination of sensors 34.

The device 12 may also have a timer shutoff unit 42 couple to the processing unit 38. The timer shutoff unit 42 may be used to send a signal to deactivate the display monitor 26 and the video cameras 14A after a predetermine amount of time has passed or after the ignition of the vehicle 10 has been turned off.

The elements of device 12 may be powered by a power supply 44. In accordance with one embodiment, the power supply 44 may be a battery of the vehicle.

In operation, when vehicle 10 has been started, the processing unit 38 may monitor the signals from the sensors 34 and controls 36. The processor 38 may activate/deactivate the display monitor 26 and the video cameras 14A based on the signals received. When the display monitor 26 and the video cameras 14A are activated, any passenger in the rear seat 30 may be able to see if there are any potential dangers in opening the rear door 20 of the vehicle 10.

Referring to FIGS. 2-4 and 6-7, in this embodiment, the monitoring unit 14 may be a rear seat wing mirror 14B (hereinafter wing mirror 14B). The wing mirror 14B may be located on different areas of vehicle 10. In accordance with the present embodiment, the wing mirror 14B may be located on one or both of the B pillars 16A located between the front door 18 and rear door 20 of the vehicle 10. The wing mirror 14B may allow a passenger seated in the rear seat 30 to see areas behind the vehicle 10 by reflecting images of this area. By reflecting the areas located behind the vehicle 10, the passenger seated in the rear seat 30 may be able to see if there are any potential dangers in opening the rear door 20 of the vehicle 10.

The wing mirror 14B may have a frame 46. The frame 46 may have a mounting section 48 formed on one of the side edges of the frame 46. The mounting section 48 may be used to secure the wing mirror 14B to vehicle 10. In accordance with one embodiment, mounting section 48 may be used to secure frame 46 to the B pillar 16A of the vehicle 10 located between the front door 18 and rear door 20. A plurality of connectors 56 may be used to secure the frame 46 to the vehicle 10. The connectors 56 may be screw and nuts, male and female latch connectors, and similar types of connectors.

A housing 50 may be rotatably coupled to the frame 46. The housing 50 may be used to rotatable secure a mirror 52 within the frame 46. The housing 50 may allow one to adjust a position of the mirror 52 within the frame 46. This may allow a passenger sitting in the rear seat 30 to adjust the position of the mirror 52 to better see any potential dangers when opening the rear door 20 of the vehicle 10.

In accordance with one embodiment, the housing 50 may have an arm member 54 which may extend into the interior 10A of the vehicle 10. Arm member 54 may allow the passenger sitting in the rear seat 30 to adjust the position of the mirror 52 while remaining seated in the vehicle 10 to better see any potential dangers when opening the rear door 20 of the vehicle 10.

In accordance with one embodiment, larger versions of the wing mirror 14B may be placed on pillars, street sign poles, and other areas along a street. Thus, when vehicle 10 pulls to the side of a road, the passenger may check the wing mirror 14B for any potential dangers when opening the rear door 20 of the vehicle 10. In this embodiment, the wing mirror 14B may just be the mirror 52 attached to the frame 46 where the frame still has a mounting section 48 to attach the wing mirror 14B on pillars, street sign poles, and other areas along a street.

The foregoing description is illustrative of particular embodiments of the application but is not meant to be a limitation upon the practice thereof. The following claims, including all equivalents thereof, are intended to define the scope of the application.

What is claimed is:

1. A rear seat viewing device for a vehicle comprising:
at least one monitoring device coupled to an exterior of the vehicle for monitoring activities behind the vehicle, wherein the at least one monitoring device is a video camera;
a video display coupled to the video camera and showing the activities behind the vehicle, the video display positioned within a headrest for viewing by passengers in a rear seat; and
a sensor and control unit monitoring for occupancy of the rear seat and activating the video camera and the video display to show objects and activities located behind the vehicle when the vehicle is parked and the rear seat is occupied.

2. The rear seat viewing device of claim 1, wherein the sensor and control unit comprises a plurality of sensors coupled to the video display and the video camera.

3. The rear seat viewing device of claim 2, wherein the plurality of sensors comprises a transmission sensor and a rear seat weight sensor.

4. The rear seat viewing device of claim 3, wherein the plurality of sensors comprises a speed sensor.

5. The rear seat viewing device of claim 3, wherein the plurality of sensors comprises a rear handle sensor to monitor opening of the rear door to activate the video display and video camera.

6. The rear seat viewing device of claim 2, wherein the sensor and control unit comprises control buttons to activate and deactivate the video display and the video camera.

7. The rear seat viewing device of claim 2, wherein the sensor and control unit comprises timer to automatically deactivate the video display and the video camera after a predetermined timeframe.

8. The rear seat viewing device of claim 2, wherein the sensor and control unit comprises processing unit coupled to the plurality of sensors monitoring signals from each of the plurality of and activating and deactivating the video display and the video camera based on the signals monitored.

9. The rear seat viewing device of claim 1, wherein inputs from a combination of sensors activates the video display and the video camera.

10. A rear seat viewing device for a vehicle comprising:
at least one monitoring device coupled to an exterior of the vehicle for monitoring activities behind the vehicle, wherein the at least one monitoring device is a video camera showing activities located behind the vehicle;
a video display positioned in a rear headrest of the vehicle and coupled to the video camera and showing the activities behind the vehicle; and
a plurality of sensors coupled to the video display and the video camera, wherein inputs from a combination of sensors activates the video display and the video camera, wherein the plurality of sensors comprises a transmission sensor and a rear seat weight sensor, the video camera and the video display activated when the transmission sensor monitors that the vehicle is parked and the rear seat weight sensor monitors occupancy of the rear seat of the vehicle.

11. The rear seat viewing device of claim 10, wherein the plurality of sensors comprises a speed sensor and a rear handle sensor.

12. The rear seat viewing device of claim 10, comprising:
control buttons to activate and deactivate the video display and the video camera; and
a timer to automatically deactivate the video display and the video camera after a predetermined timeframe.

* * * * *